United States Patent [19]

Goll et al.

[11] Patent Number: 5,023,925
[45] Date of Patent: Jun. 11, 1991

[54] HOT AIR HAND WELDING DEVICE

[75] Inventors: Günther Goll, Hochdorf; Peter Vater, Gruibingen; Siegfried Keusch, Plochingen; Günter Kratz, Hochdorf, all of Fed. Rep. of Germany

[73] Assignee: Zinser Schweisstechnik GmbH & Co., Fed. Rep. of Germany

[21] Appl. No.: 416,476

[22] Filed: Oct. 3, 1989

[30] Foreign Application Priority Data

Oct. 4, 1988 [DE] Fed. Rep. of Germany ....... 3833677

[51] Int. Cl.[5] .......................... H05B 1/00; F24H 3/04; A45D 20/10
[52] U.S. Cl. .................... 392/384; 392/383; 392/385; 392/379; 34/97
[58] Field of Search .......... 219/359, 369–371, 219/373, 364, 367, 379–380; 34/96–101

[56] References Cited

U.S. PATENT DOCUMENTS

| 1,821,525 | 10/1929 | Nielsen | 219/370 |
| 2,031,391 | 2/1936 | Spielman | 219/370 |
| 2,478,559 | 8/1949 | Bergeron | 219/373 |
| 4,039,774 | 8/1977 | Kata et al. | 219/370 |

FOREIGN PATENT DOCUMENTS 511589 10/1930 Fed. Rep. of Germany .
2750954 11/1977 Fed. Rep. of Germany .

Primary Examiner—Bruce A. Reynolds
Assistant Examiner—John A. Jeffery
Attorney, Agent, or Firm—Wigman & Cohen

[57] ABSTRACT

In a hot air hand welding device having a plastic housing (1,3,6) which forms a rod-like grip portion (1) provided with air inlet openings and in which a commutator motor (18) is secured for the drive of a blower wheel (23) that is surrounded by a section (3) of the housing (1,3,6) that adjoins the grip (1) and has a larger diameter, the blower wheel (23) is arranged adjacent to the commutator (20) of the commutator motor (18). In addition the commutator (20) as well as the carbon brushes that contact it, together with the associated brush holders (21), are arranged in the section (3) of the housing surrounding the blower wheel (23).

9 Claims, 3 Drawing Sheets

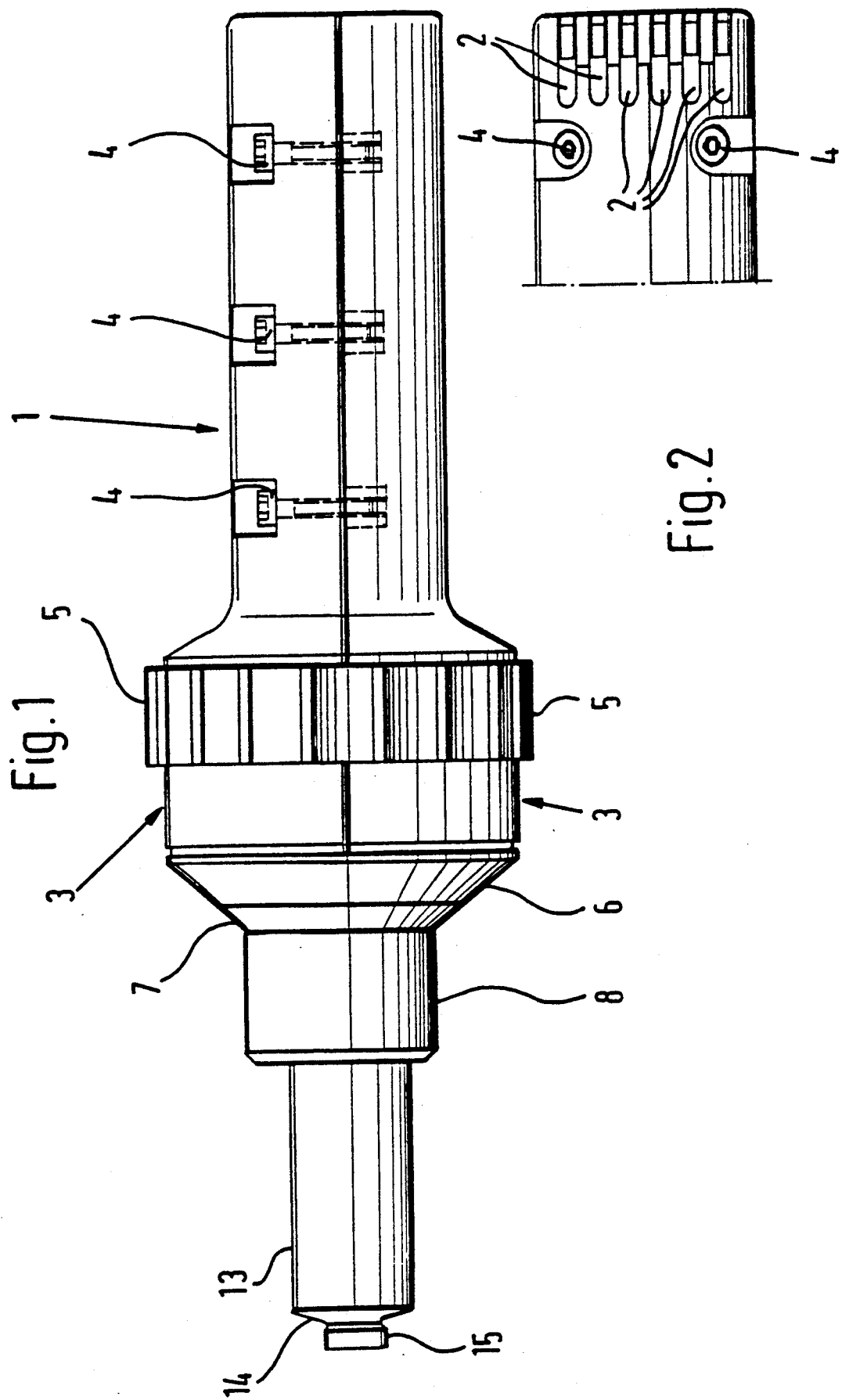

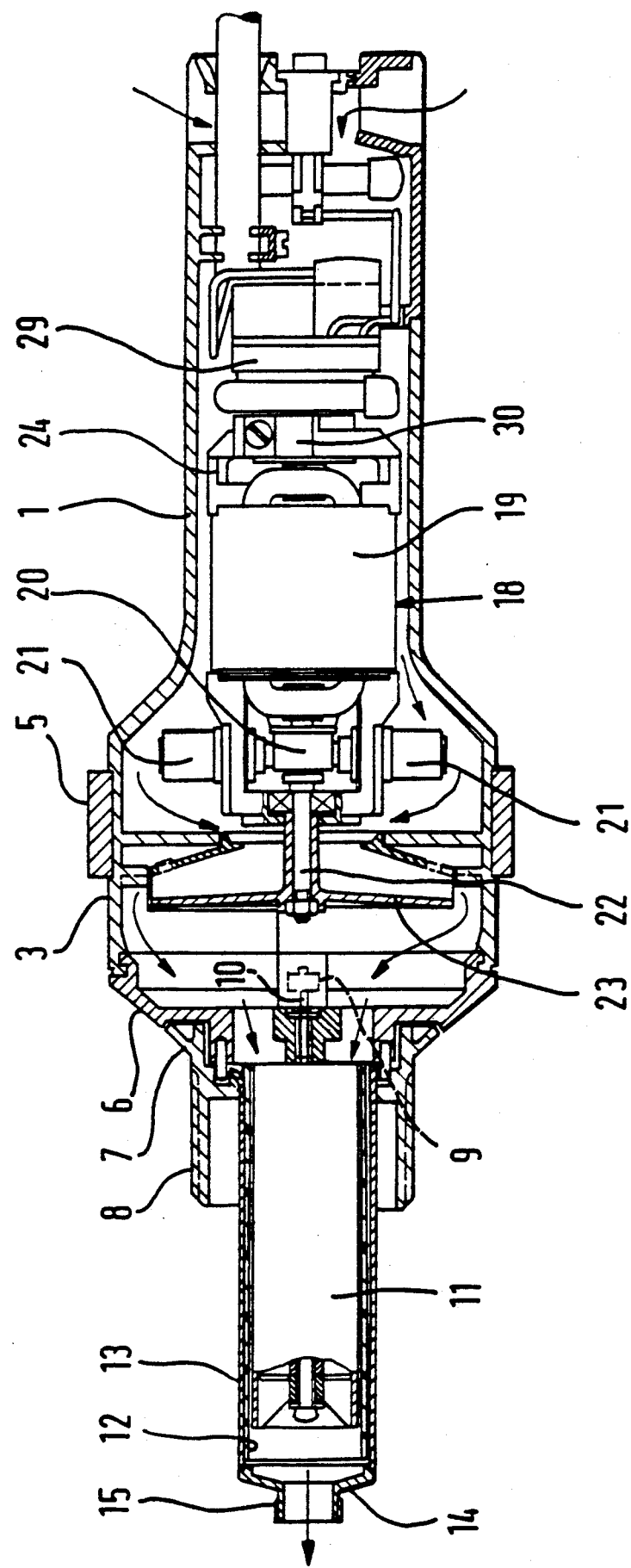

HOT AIR HAND WELDING DEVICE

BACKGROUND OF THE INVENTION

Field of the Invention

The invention relates to a hot air hand welding device with a plastic housing that forms a bar-like grip element that is provided with air inlet openings and in which a commutator motor is secured for driving a blower wheel that is surrounded by a larger diameter section of the housing adjacent to the grip portion and with an end section adjoining this larger diameter section opposite the grip portion which has a connecting device for a heating cartridge and a protection and connection tube that surrounds this heating cartridge.

Because the outside diameter of the grip portion may not exceed a given value in order to assure convenience in handling the device, and because in known devices of the above-described type, the commutator of the motor housed in the grip portion is arranged on the side of the rotor facing the free end of the grip portion, a space for housing the carbon brushes that cooperate with the commutator is limited. In the known device, therefore, the carbon brushes have a relatively short effective life. Also, disadvantageous is the fact that the mounting of the commutator motor is relatively expensive as is the mounting of the elements connected with it in the grip portion of the housing. If an air quantity control is provided, it is accomplished by changing the size of the openings in the air inlet provided in the grip portion. The result, therefore, can be excessive temperatures in the motor and, above all, in the control electronics for the heating cartridge, which is arranged between the commutator motor and the free grip end in the air flow that enters there. Additional disadvantages in the known devices are seen in the fact that nozzles can be provided either of the push-on type or screw-on type and that the hand of the servicing person is in danger of coming into contact with the protection and connection tube, which, during operation, may have an extremely high temperature. This danger is present particularly when the end device supporting the nozzle must be pressed against the welding point.

SUMMARY AND OBJECTS OF THE INVENTION

The object of the invention is to create a hot air hand welding device which is free of at least one of the deficiencies in known devices.

This object is achieved by a hot air hand welding device in which a blower wheel is arranged adjacent to the commutator, and in which the commutator and the carbon brushes that contact the commutator are arranged with the associated brush holders in the section of the housing of the device surrounding the blower wheel.

By arranging the blower wheel adjacent to the commutator, it is possible to arrange the motor in the housing in such a manner that the commutator and the associated brush apparatus lie in the section of the housing surrounding the blower wheel. Because this section can have a significantly larger diameter than the section forming the grip portion, and in practice also has such a larger diameter, sufficient space is available for the brush apparatus in the radial direction that brushes can be used that have many times the life expectancy in these known devices. The space is even sufficient to house turn-off brushes that cause the device to be turned off when the brush length has reached a given minimal value which may not be exceeded.

In one preferred embodiment, the grip portion is provided in two shell-type pieces. This provides a shorter mounting time. Also contributing to a shortening of the mounting time is an embodiment of half-shells, because here the necessity is removed for connecting the motor and the other elements to be housed in the grip portion to the grip portion with screws.

By means of the fact that the brush apparatus no longer need be housed in the grip portion, it is possible to provide a sufficiently large intermediate space between the outer cover surface of the stator of the commutator motor and the inner cover surface of the housing that the largest portion of the air aspirated by the blower wheel flows through this intermediate space. This has the advantage that the motor as well as its commutator are largely protected against damage from particles contained in the aspirated air.

In another preferred embodiment of the device according to the invention, an air discharge opening is provided in the portion of the housing surrounding the blower on the pressure side of the blower wheel, which can be opened to a greater or lesser degree but cannot be completely closed. A control of this type for the air quantity flowing through the heating element has significant advantages relative to the known control accomplished by changing the size of the air inlet openings. Specifically, this provision assures that the motor, and especially the electronic elements, continuously experiences cooling by an adequately large air flow. By means of the fact that the air discharge opening cannot be completely closed it is further assured that if the nozzle is closed, sufficient air will be aspirated to cool the motor and the electronic elements.

In order to assure that the user does not contact the protection and connecting tube with a hand when pressing the nozzle against the welding point a protecting element adjoins the end section of the housing which surrounds the protection and connecting tube over a portion of its length at a slight distance. The user can support his hand that must be used to press the nozzle against the welding point on this protection element. One effective way of accomplishing this object is to form the protection element in one piece, with a coupling ring which detachably connects the protection and connecting tube with the housing.

In order to be able to selectively use both the common push-on nozzles as well as the known screw-on nozzles, the protection and connecting tube can also be formed with a threaded section to accommodate interchangeable nozzles.

The invention is described in greater detail below, with the assistance of an exemplary embodiment that is illustrated in the drawings. Shown are:

BRIEF DESCRIPTION OF THE DRAWINGS

FIG. 1 is a side view of the exemplary embodiment,

FIG. 2 is a top view of the end section of the grip portion of the exemplary embodiment, FIG. 3 is a longitudinal section of the exemplary embodiment.

DETAILED DESCRIPTION OF THE PREFERRED EMBODIMENTS

Figure 4:
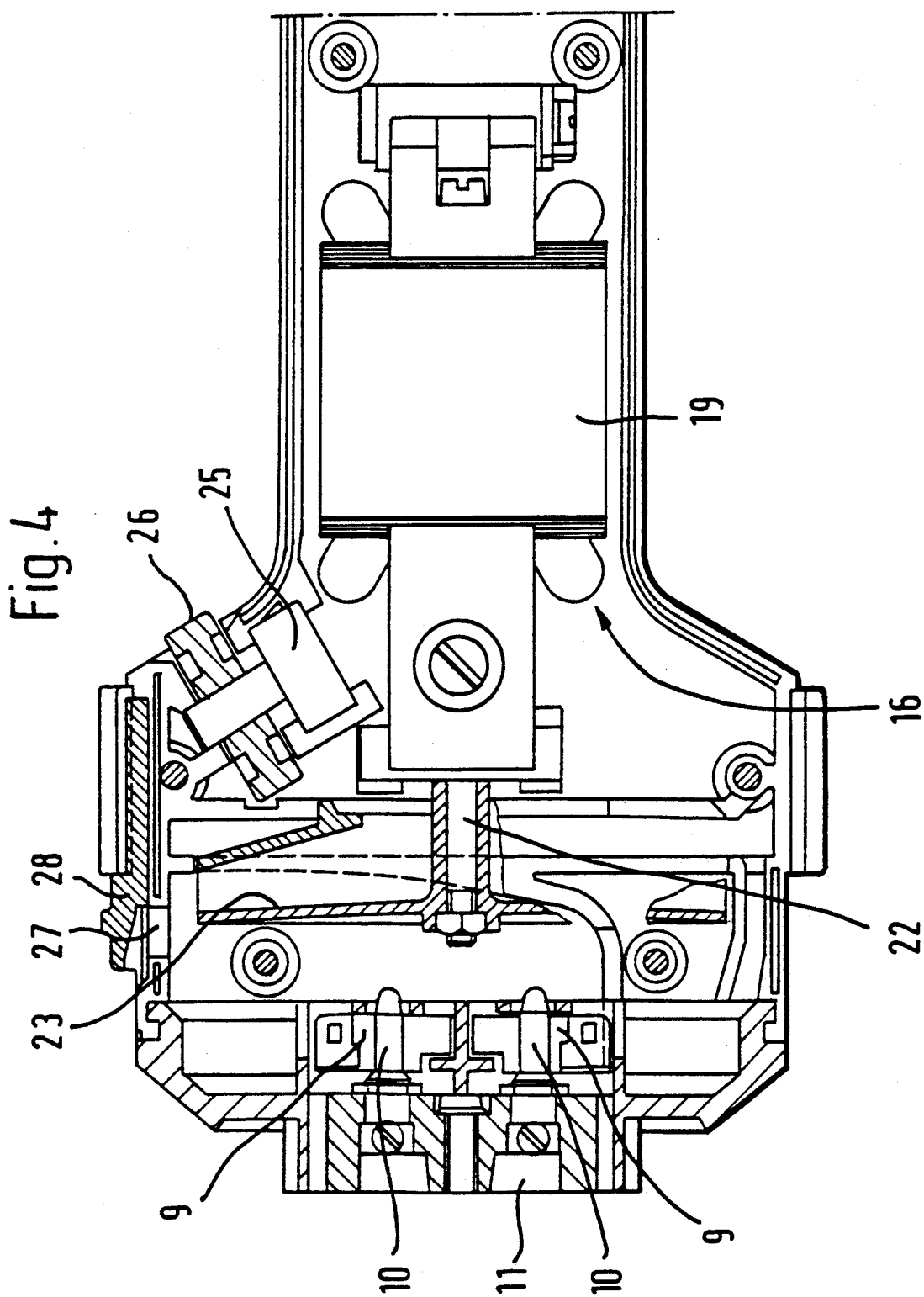
FIG. 4 is an enlarged partial longitudinal section as compared to FIG. 3, that is shown in a sectional plane rotated by 90 degrees relative to the section shown in FIG. 3.

A hot air hand welding device has a plastic housing which, as shown in FIG. 1, forms a grip portion 1 having the shape of a cylindrical rod. As shown in FIG. 2, the free end of the grip portion 1 of the housing is provided with air intake openings 2. At its opposite end, the grip portion 1 is connected with another cylindrical section 3 of the housing that has a significantly larger diameter. Both this section 3 and the grip portion 1 are formed by two half shells which are detachably connected with each other in the area of the grip portion 1 and the section 3 by means of screws 4. A rubber ring 5 surrounds a portion of the length of the section 3 to provide a rest for the device. An end section 6 is provided on the side of the housing opposite the grip portion 1, and a form-fitting connection is provided between end section 6 and the section 3. As shown in FIG. 1, this end section 6 tapers conically, becoming narrower toward its end opposite the section 3, where a threaded section is provided for the engagement of a cap nut 7, to which is connected a tubular protection element 8 that is coaxial both to the cap nut 7 and to the housing, and is formed in one piece with the cap nut 7, which is also made of plastic. Other types of connections, such as a bayonet connection, however, can also be used in place of the screw connection.

The end section 6 of the housing contains a plug receptacle 9 to receive the plug pins 10 of a cylindrical heating cartridge or element 11 which is arranged coaxially to the housing and which extends to an appreciable degree beyond the free end of the protection element 8. An insulating sleeve 12 made from a heat-insulating material is pushed over the heating element 11 and projects slightly beyond the free end of the heating cartridge. This insulating sleeve is surrounded by a metallic protecting and connecting tube 13, which is provided, at its end adjacent to the end section 6 of the housing, with a flange that is detachably clamped between the end section 6 and the cap nut 7.

The outside diameter of the protecting and connecting tube 13 is selected such that it corresponds to the seat diameter of the known push-on nozzles. These nozzles can therefore be exchangeably mounted on the free end section of the protecting and connecting tube 13. A nozzle connection element 14 is provided on the free end of the protecting and connecting tube 13, the end section of which, having a reduced diameter, is provided with an external threading 15, onto which the known threaded nozzles can be screwed.

A commutator motor 16 is secured in the grip portion 1 coaxially thereto by means of a clamping action between the two half shells, in such a manner, as shown in FIG. 3, that its commutator 20 and the brush holder 21 secured in the end plate lie in the section 3 of the housing.

The motor shaft 22, which extends beyond the commutator 20, supports a blower wheel 23 which is also arranged in the section 3 of the housing and forces the aspirated air through the heating cartridge 11, so that it passes out of the nozzle connection element 14 after having been heated.

The end plate 24 of the commutator motor 18, which is in a good heat-conducting connection with the stator 19 on the side opposite the commutator 20, forms the cooling element of a control circuit 29 which contains a triac 30 to control the heat flow for the heating cartridge 11. The associated resistor, which is formed by a potentiometer 25, is, as shown in FIG. 4, arranged in the transition area from the grip portion 1 to the section 3 of the housing, which here has an opening which makes an adjusting wheel 26 accessible. This adjusting wheel 26 is rigidly arranged on the shaft of the potentiometer 25 and can easily be activated with one finger of the hand holding the grip portion 21

The intermediate space between the outer cover surface of the stator 19 and the inner cover surface of the grip portion 1, as shown in FIGS. 3 and 4, is selected to be of such a size that at least the greatest portion of the air aspirated by the blower wheel 23 through the air inlet openings 2 flows over the control circuit 29, the cooling element and the outer cover surface of the stator 19, by which means it is achieved that particles moving with the air do not all flow past the commutator 20. This results in a reduction in brush wear. An air outlet opening 27 is provided in the section 3 of the housing in the area where the high pressure prevails that is produced by the blower wheel 23, to provide control for the air quantity flowing through the heating cartridge 11, which air outlet opening can be steplessly opened or closed down to a minimum opening area by means of a manually activatable closure element or slide 28 which is arranged so as to be capable of sliding between the housing and the rubber ring 5 in an axial direction. This minimum cross-sectional area is selected in such a manner that when no air can pass through the nozzle or the nozzle connecting element 14, the quantity of air necessary for the cooling of the commutator motor 18 and the control circuit 24 is aspirated by the blower wheel 23 through the grip portion 1.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:
1. A hot air welding device comprising:
 a plastic housing that forms a rod-like grip portion that is provided with air inlet openings;
 a commutator motor which includes a stator and a rotor, said commutator motor having a commutator and carbon brushes secured in said housing and driving a blower wheel which is surrounded by a section of the housing adjoining the grip portion but of a greater diameter, the stator and rotor of said commutator motor being positioned within said grip portion;
 said greater diameter housing section being connected to an end section on the side opposite the grip portion, which end section has a connection device connected to a heating cartridge and a protection and connecting tube surrounding said connection device and said heating cartridge; wherein said blower wheel (23) is arranged adjacent to the commutator (20) of the commutator motor (18);
 and wherein the commutator (20) and the carbon brushes that contact said commutator are arranged with the associated brush holders (21) in the section (3) of the housing surrounding the blower wheel (23).

2. The device according to claim 1, wherein the section of the housing that forms the grip portion (1) is comprised of two half shells.

3. The device according to claim 2, wherein the two half shells are formed as a clamping device which secures the commutator motor (18) in the housing.

4. The device according to claim 1, wherein an intermediate space extending over the entire length of the motor is provided between the outer surface of the stator (19) of the commutator motor (18) and the inner surface of the housing, said intermediate space having a cross-section that is selected so as to provide that at least a large portion of the air aspirated through the inlet openings by the blower wheel (23) flows through this intermediate space to the blower wheel (23).

5. A hot air welding device comprising:
   a plastic housing that forms a rod-like grip portion that is provided with air inlet openings;
   a commutator motor having a commutator and carbon brushes secured in said housing and driving a blower wheel which is surrounded by a section of the housing adjoining the grip portion but of a greater diameter;
   said greater diameter housing section being connected to an end section on the side opposite the grip portion, which end section has a connection device connected to a heating cartridge and a protection and connecting tube surrounding said connection device and said heating cartridge; wherein said blower wheel (23) is arranged adjacent to the commutator (20) of the commutator motor (18);
   and wherein the commutator (20) and the carbon brushes that contact said commutator are arranged with the associated brush holders (21) in the section (3) of the housing surrounding the blower wheel (23);
   wherein in that in the section (3) of the housing that surrounds the blower wheel (23), at least one air outlet opening (27) is provided on the pressure side of the blower wheel (23), and a manually activatable closure element (28) is associated therewith which can be adjusted between the positions of maximum and minimum aperture of this opening, whereby in the position of minimum aperture, the opening is only partially closed.

6. The device according to claim 5, wherein the closure element is formed as a slide (28).

7. The device according to claim 1, wherein a protective element (8) adjoins the end section (6) of the housing, said protective element surrounding the protection and connecting tube (13), at a spaced distance, over a portion of its length.

8. The device according to claim 7, wherein the protective element (8) is made of plastic and is formed in one piece with a cap nut (7).

9. The device according to claim 1, wherein in addition to a seat for exchangeable nozzles on the free end of the protection and connecting tube (13), which seat is formed by the outer cover surface of the protection and connecting tube (13), a nozzle connection element (14) is provided having a threaded section onto which exchangeable nozzles can be screwed.

* * * * *